US006771111B2

(12) United States Patent
Sheng et al.

(10) Patent No.: US 6,771,111 B2
(45) Date of Patent: Aug. 3, 2004

(54) PRECISION ANALOG EXPONENTIATION CIRCUIT AND METHOD

(75) Inventors: Samuel W. Sheng, Los Gatos, CA (US); Ivan C. Eng, Santa Clara, CA (US)

(73) Assignee: LSI Logic Corporation, Milpitas, CA (US)

( * ) Notice: Subject to any disclaimer, the term of this patent is extended or adjusted under 35 U.S.C. 154(b) by 70 days.

(21) Appl. No.: 10/341,963

(22) Filed: Jan. 13, 2002

(65) Prior Publication Data

US 2003/0132795 A1 Jul. 17, 2003

(51) Int. Cl.[7] .................................................. G06F 7/556
(52) U.S. Cl. ........................................ 327/346; 330/258
(58) Field of Search ............................... 327/65–67, 87, 327/89, 346, 563; 330/258

(56) References Cited

U.S. PATENT DOCUMENTS 4,293,822 A * 10/1981 McFadyen .................. 330/254
5,008,632 A * 4/1991 Sutterlin ..................... 330/256
5,808,501 A * 9/1998 Ivanov ....................... 327/333

* cited by examiner

*Primary Examiner*—Kenneth B. Wells
(74) *Attorney, Agent, or Firm*—Fitch, Even, Tabin & Flannery

(57) ABSTRACT

A precision analog exponentiation circuit includes a precision analog exponentiation circuit includes a first transistor coupled to a reference current for generating a voltage at the first transistor, a second transistor coupled to the first transistor for generating an output current, a variable current source coupled to the first transistor and the second transistor for generating a sum of the reference current and the output current in response to a feedback signal, and a feedback amplifier coupled to the first transistor for generating the feedback signal wherein the variable current source maintains the voltage at the first transistor substantially equal to a reference voltage so that the output current is substantially equal to an exponential function of a control voltage coupled to the first transistor and the second transistor.

9 Claims, 3 Drawing Sheets

PRECISION ANALOG EXPONENTIATION CIRCUIT AND METHOD

BACKGROUND OF THE INVENTION

1. Field of the Invention

The present invention is directed to electronic circuits for generating exponential functions. More specifically, but without limitation thereto, the present invention is directed to an electronic circuit for generating an output current that is an exponential function of a control current.

2. Description of the Prior Art

In many analog and radio frequency (RF) communications systems, for example, television and cellular telephony, the received signal often has a highly variable amplitude. This variation in amplitude is typically a result of transmission distance, fading, and various imperfections in the transmission medium. To prevent saturation of the receiver while maximizing the signal-to-noise ratio, the receiver gain is typically controlled by an automatic gain control circuit. The automatic gain control generally includes a variable gain amplifier (VGA) having a gain that is a function of a control voltage or current.

SUMMARY OF THE INVENTION

In one aspect of the present invention, a precision analog exponentiation circuit includes a first transistor coupled to a reference current for generating a voltage at the first transistor, a second transistor coupled to the first transistor for generating an output current, a variable current source coupled to the first transistor and the second transistor for generating a sum of the reference current and the output current in response to a feedback signal, and a feedback amplifier coupled to the first transistor for generating the feedback signal wherein the variable current source maintains the voltage at the first transistor substantially equal to a reference voltage so that the output current is substantially equal to an exponential function of a control voltage coupled to the first transistor and the second transistor.

In another aspect of the present invention, a method of generating a precision analog exponentiation function includes steps for generating a reference current through a first transistor to generate a voltage at the first transistor, generating an output current through a second transistor, generating a sum of the reference current and the output current by a variable current source in response to a feedback signal, and generating the feedback signal to maintain the voltage at the first transistor substantially equal to a reference voltage so that the output current is substantially equal to an exponential function of a control voltage coupled to the first transistor and the second transistor.

DESCRIPTION OF THE ILLUSTRATED EMBODIMENTS

The present invention is illustrated by way of example and not limitation in the accompanying figures, in which like references indicate similar elements throughout the several views of the drawings, and in which.

Elements in the figures are illustrated for simplicity and clarity and have not necessarily been drawn to scale. For example, the dimensions of some of the elements in the figures may be exaggerated relative to other elements to help to improve understanding of the following description of the illustrated embodiments.

DESCRIPTION OF THE ILLUSTRATED EMBODIMENTS

A variable-gain amplifier (VGA) typically receives a control input, which may be either analog or digital, that is used to control the gain of the variable-gain amplifier. The control input may be, for example, a voltage or current representative of the root-mean-square of a communications signal received by the variable-gain amplifier. A disadvantage of a variable-gain amplifier having a gain that is linearly proportional to the control voltage or current is that small changes in the control voltage or current may result in large changes in gain of the variable-gain amplifier at low gain levels, for example, when a larger signal may saturate the receiver. Alternatively, the control signal may be transformed into an exponential function that varies the gain of the variable-gain amplifier as an exponential function of the control signal. This type of control is referred to as linear-in-decibels, or exponential. An exponential gain control provides a continuously variable, wide gain control range while providing more precise gain control at lower gain settings.

To generate an exponential gain control requires a transformation of a linear control signal, which may be a voltage or current or their digital equivalent, to an exponential signal, which may be a voltage or current or their digital equivalent. The exponential signal is then received as the gain control by the variable-gain amplifier.

Many methods have been devised for generating the exponential function of the control signal; however, they tend to be sensitive to various factors such as device mismatch and process variability.

Figure 1:
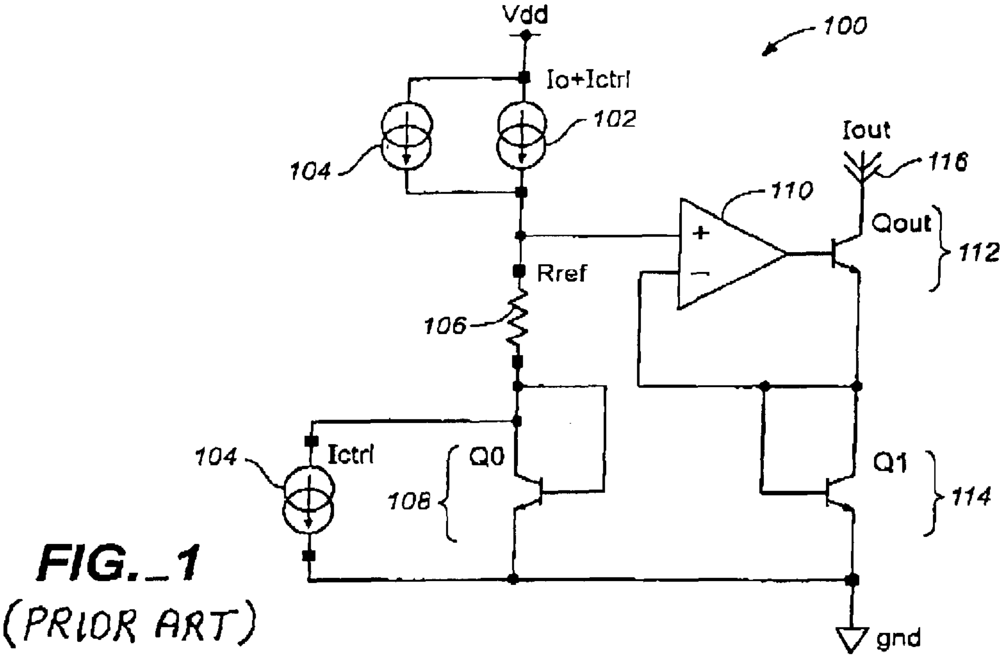
FIG. 1 (PRIOR ART)
FIG. 1 illustrates a circuit of the prior art for generating an exponential control signal.

FIG. 1 illustrates a circuit 100 of the prior art for generating an exponential control signal. Shown in FIG. 1 are a reference current source 102, control current sources 104, a resistor 106, a first transistor 108, an operational amplifier 110, a second transistor 112, a third transistor 114, and an output current 116.

In the arrangement of FIG. 1, the current from the reference current source 102 is transformed into a voltage by the resistor 106 that is applied through the operational amplifier 110 to the base-emitter voltage of the third transistor 114. Because the output current of the third transistor 114 is exponentially dependent on the base-emitter voltage, the output current 116 is exponentially controlled by the control current from the control current sources 104.

There are several disadvantages to the circuit of FIG. 1. For example, any offset in the operational amplifier translates directly into a shift in the base-emitter voltage applied to the second transistor 112, which may result in a variability of as much as 300 percent in the input-to-output exponential characteristic. In this circuit, the devices providing the exponential characteristic are outside the feedback loop of the operational amplifier 110. Also, the circuit of FIG. 1 inherently starts with a small current from the reference current source 102 and adds the control current 104. Due to the high dynamic range, a small error in the reference current may result in a large error in the output current 116. Still further, the circuit of FIG. 1 depends on a cancellation at the input to establish the output current 116, that is, the control current must be removed before it enters the first transistor 112. Any error in the cancellation may result in a large error in the output current 116.

In one aspect of the present invention, a precision analog exponentiation circuit includes a first transistor coupled to a reference current for generating a voltage at the first transistor, a second transistor coupled to the first transistor for generating an output current, a variable current source coupled to the first transistor and the second transistor for generating a sum of the reference current and the output current in response to a feedback signal, and a feedback amplifier coupled to the first transistor for generating the feedback signal wherein the variable current source maintains the voltage at the first transistor substantially equal to a reference voltage so that the output current is substantially equal to an exponential function of a control voltage coupled to the first transistor and the second transistor.

Figure 2:
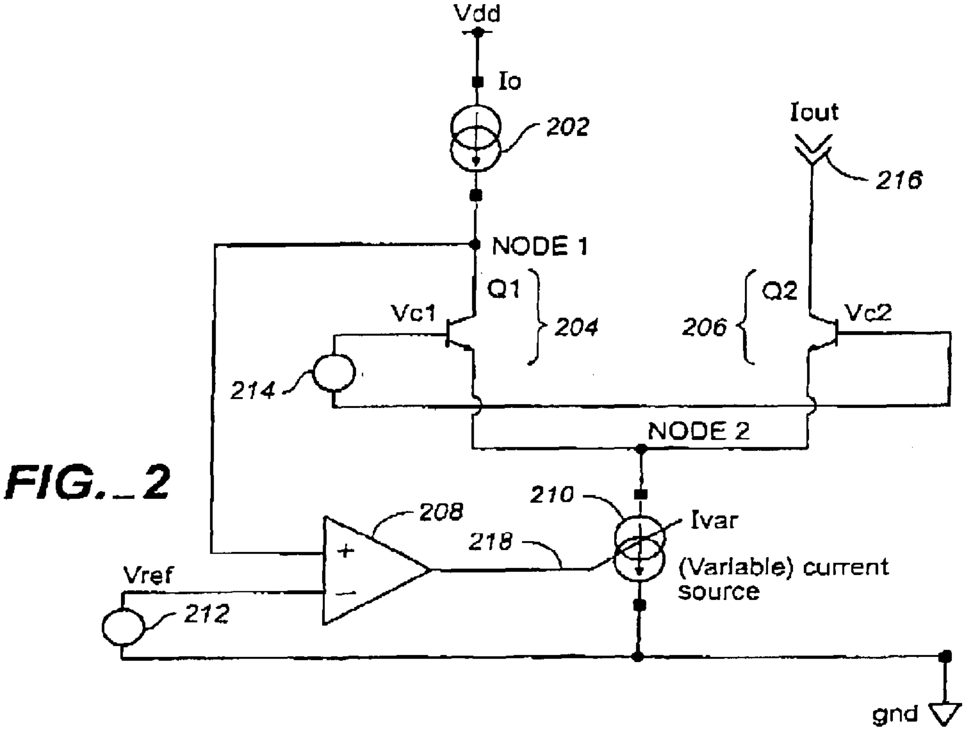
FIG. 2 illustrates a precision analog exponentiation circuit according to an embodiment of the present invention.

FIG. 2 illustrates a precision analog exponentiation circuit 200 according to an embodiment of the present invention. Shown in FIG. 2 are a reference current source 202, a first transistor 204, a second transistor 206, a feedback amplifier 208, a variable current source 210, a reference voltage source 212, a control signal source 214, an output current 216, and a feedback signal 218.

In this example, the first transistor 204 and the second transistor 206 are devices having an exponential current vs. voltage characteristic, for example, bipolar transistors. However, other such exponential-characteristic devices may be used in other embodiments to practice the invention within the scope of the appended claims, and the term transistor as used herein is intended to include all such devices. The first transistor 204 and the second transistor 206 are preferably process matched to minimize the effect of mismatch and offsets. The reference current source 202 generates a reference current that is preferably a constant current, however, a varying reference current may also be used in other embodiments to practice the invention within the scope of the appended claims. The second transistor 206 generates the output current 216 to be used, for example, as the gain control signal of a variable-gain amplifier.

The reference current from the reference current source 202 produces a voltage at the first transistor 204, at NODE 1 in FIG. 2. The voltage at the first transistor 204 is received as input by the feedback amplifier 208, which may be, for example, an operational amplifier. The feedback amplifier 208 amplifies the difference between the voltage at NODE 1 and a reference voltage received from the reference voltage source 212; this amplified signal is the feedback signal 218. The action of the negative feedback loop thus forces the voltage at NODE 1 to be substantially equal to Vref. The reference voltage Vref is somewhat arbitrary, that is, the precision analog exponentiation circuit 200 is designed to be insensitive to the exact value of the reference voltage Vref and the offset voltage of the feedback amplifier 208. However, the reference voltage Vref should be sufficient to ensure that the reference current source 202 functions properly, typically at least 300 to 500 millivolts across the reference current source 202. An exemplary value of the reference voltage Vref is about 0.5 Volts below Vdd. For example, with a Vdd of 3.3 Volts, the reference voltage Vref may be (3.3–0.5)=2.8 Volts. The feedback signal 218 drives the output of the variable current source 210 to be substantially equal to the sum of the reference current 202 and the desired output current 216, so that the voltage at NODE 1 is maintained substantially equal to the reference voltage Vref.

The control signal source 214 is connected to the first transistor 204 at $V_{C1}$ and the second transistor 206 at $V_{C2}$. The negative feedback provided by the feedback amplifier 208 forces the current through the first transistor 204 to be substantially equal to the reference current through the reference current source 202. The collector current ($I_C$) of a bipolar transistor may be expressed as a function of the base-emitter voltage ($V_{be}$) according to formula (1) below:

$$I_C = I_S exp(Vbe/Vt) \tag{1}$$

where $I_S$ is the saturation current of the bipolar device and $V_t$ equals kT/q, where k is Boltzmann's constant, T equals temperature in degrees Kelvin, and q equals the electron charge in Coulombs. At room temperature, $V_t$ is approximately equal to 0.0259 volts. The voltage across the variable current source 210, at NODE 2 in FIG. 2, is then given by formula (2) below:

$$V_{CI} - V_t \ln\left(\frac{I_O}{I_S}\right) \tag{2}$$

Because ($V_{C2}$–$V_{C1}$) is equal to the control voltage from the control signal source 214, the base-emitter voltage across the second transistor 206 is given by formula (3) below:

$$(V_{C2} - V_{C1} + V_t 1n(I_O/I_S)) \tag{3}$$

Substituting the control voltage ($V_{C2}$–$V_{C1}$) in formula (1) gives the output current 216 according to formula (4) below:

$$I_{out} = I_O \exp\left(\frac{V_{CI} - V_{C2}}{V_t}\right) \tag{4}$$

where $I_{out}$ is the output current 216. Formula (4) is precisely the desired exponential function of the control voltage ($V_{C2}$–$V_{C1}$), and the exponential function of formula (4) is clearly insensitive to process variations, being dependent only on the reference current and $V_t$, which has a known value.

The reference current is established directly by the reference current source 202, so that no subtraction or cancellation of currents is required. Further, the precision analog exponentiation circuit 200 is not affected by any offset voltage in the operational amplifier, because NODE 1, which is between the reference current source 202 and the collector of the first transistor 204, is intrinsically a high-impedance node. Still further, the precision analog exponentiation circuit 200 may readily be implemented as $e^x$ or $e^{-x}$, because the polarity of the control voltage ($V_{C2}$–$V_{C1}$) is controlled by design. Specifically, if the control voltage ($V_{C2}$–$V_{C1}$) is constrained to be negative, then the reference current $I_O$ is the largest value of the output current 216, and the output current 216 has the form of a decreasing exponential. Because the precision analog exponentiation circuit 200 can work with a large value of the reference current $I_O$, the sensitivity to any error in the reference current $I_O$ is further minimized.

Figure 3:
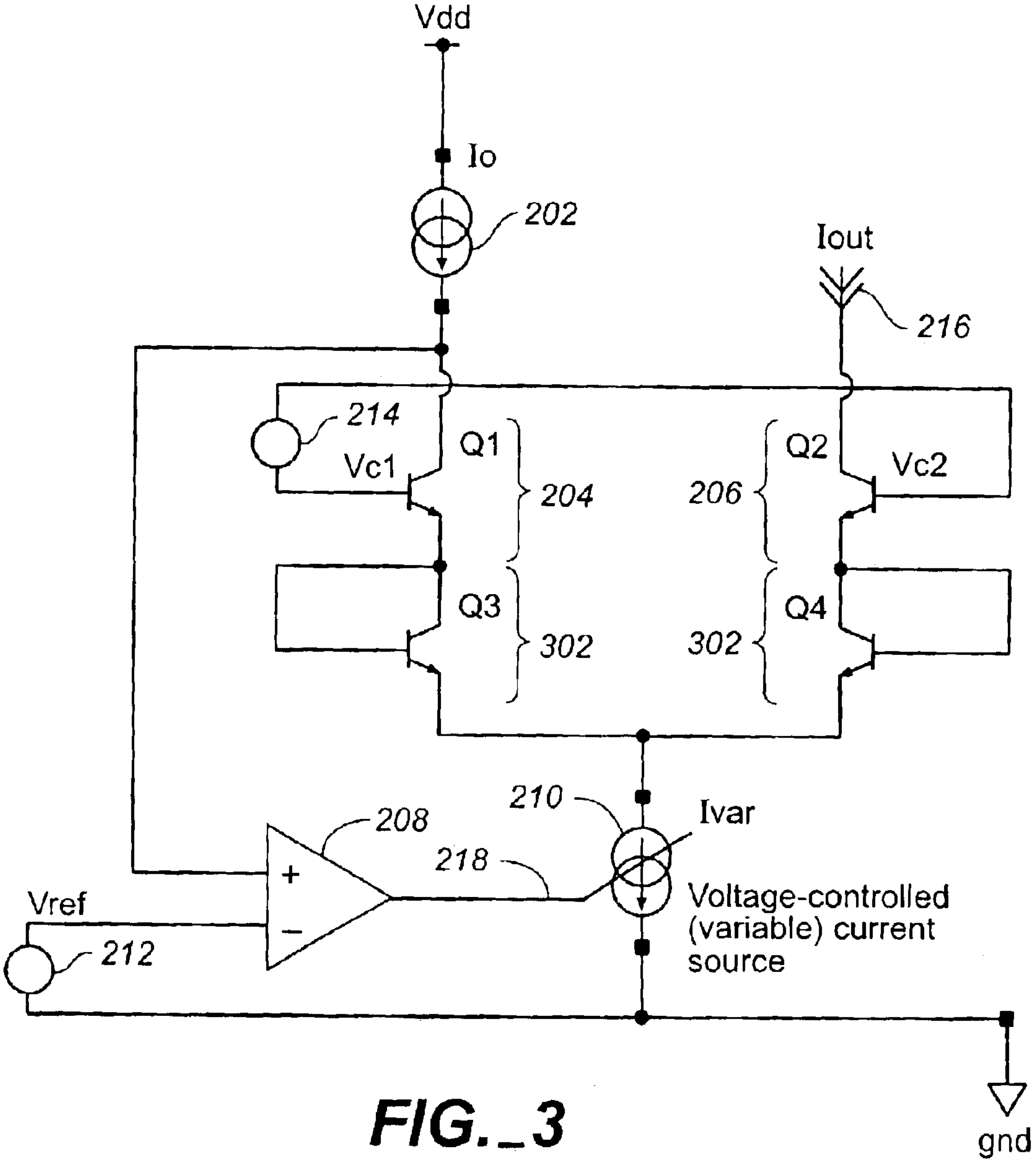
FIG. 3 illustrates an precision analog exponentiation circuit according to another embodiment of the present invention.

FIG. 3 illustrates an precision analog exponentiation circuit 300 according to another embodiment of the present invention. Shown in FIG. 3 are a reference current source 202, a first transistor 204, a second transistor 206, a feedback amplifier 208, a variable current source 210, a feedback voltage source 212, a control signal source 214, an output current 216, a feedback signal 218, and exponential-characteristic devices 302.

In the precision analog exponentiation circuit 300, one of the exponential-characteristic devices 302 is connected in series between the first transistor 204 and the variable current source 210, and another of the exponential-characteristic devices 302 is connected in series between the second transistor 206 and the variable current source 210.

The exponential-characteristic devices 302 are preferably the same bipolar transistors used for the first transistor 204 and the second transistor 206 in the example of FIG. 2; however, other such exponential-characteristic devices may be used in various embodiments to practice the present invention within the scope of the appended claims. The output current 216 may then be expressed by formula (5) below:

$$I_{out} = I_O \exp\left(\frac{V_{CI} - V_{C2}}{2 * V_t}\right) \quad (5)$$

The denominator of the exponential function is now $2V_t$, which helps to reduce the sensitivity to any error in the control voltage by a factor of two. This "stacking" procedure may be extended to include any number of bipolar devices 302, up to the limit of the supply voltage.

Alternatively, the temperature dependence on $V_t$ may be eliminated simply by making the control voltage ($V_{C2}-V_{C1}$) proportional to temperature. This may be done according to well known techniques, for example, by multiplying the control voltage by a quantity proportional to temperature, such as $V_t$ itself.

The sensitivity to voltage offset between the first transistor 204 and the second transistor 206 may be minimized by the fabrication of the first transistor 204 and the second transistor 206 by the same process. Further, it is preferable to utilize high-gain devices such as bipolar transistors to implement the first transistor 204 and the second transistor 206, because the voltage offset of a pair of bipolar transistors is extremely low. However, a calibration procedure may be used if more accuracy is desired. For example, the output current 216 may be measured for a control voltage ($V_{C2}-V_{C1}$) of zero. The output current 216 should then equal the reference current. Any difference between the output current 216 and the reference current may be removed by providing an offset to the control voltage that results in zero difference between the output current 216 and the reference current, thereby eliminating the effect of any mismatch between the first transistor 204 and the second transistor 206.

In another aspect of the present invention, a method of generating a precision analog exponentiation function includes steps for generating a reference current through a first transistor to generate a voltage at the first transistor, generating an output current through a second transistor, generating a sum of the reference current and the output current by a variable current source in response to a feedback signal, and generating the feedback signal to maintain the voltage at the first transistor substantially equal to a reference voltage so that the output current is substantially equal to an exponential function of a control voltage coupled to the first transistor and the second transistor.

Figure 4:
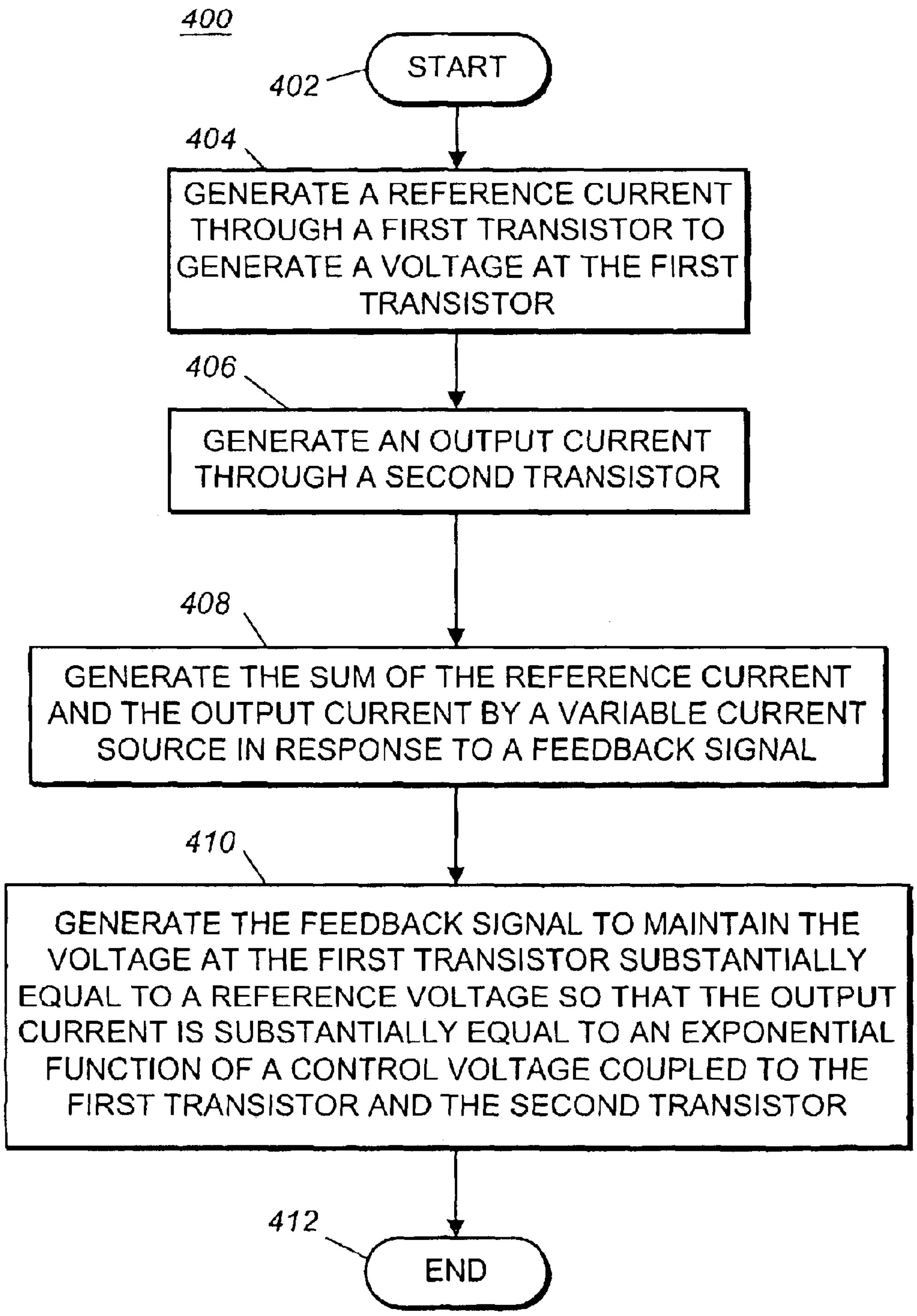
FIG. 4 illustrates a flow chart 400 for a method of generating a precision analog exponentiation function according to an embodiment of the present invention.

FIG. 4 illustrates a flow chart 400 for a method of generating a precision analog exponentiation function according to an embodiment of the present invention.

Step 402 is the entry point of the flow chart 400.

In step 404, a reference current is generated though a first transistor to generate a voltage at the first transistor.

In step 406, an output current is generated through a second transistor.

In step 408, the sum of the reference current and the output current is generated by a variable current source in response to a feedback signal.

In step 410, the feedback signal is generated to maintain the voltage at the first transistor substantially equal to a reference voltage so that the output current is substantially equal to an exponential function of a control voltage coupled to the first transistor and the second transistor.

Step 412 is the exit point of the flow chart 400.

Although the method of the present invention illustrated by the flowchart description above is described and shown with reference to specific steps performed in a specific order, these steps may be combined, sub-divided, or reordered without departing from the scope of the claims. Unless specifically indicated herein, the order and grouping of steps is not a limitation of the present invention.

While the invention herein disclosed has been described by means of specific embodiments and applications thereof, numerous modifications and variations may be made thereto by those skilled in the art without departing from the scope of the invention set forth in the following claims.

What is claimed is:

1. A precision analog exponentiation circuit comprising:

a first transistor coupled to a reference current for generating a voltage with respect to ground at the first transistor;

a second transistor coupled to the first transistor for generating an output current;

a variable current source coupled to the first transistor and the second transistor for generating a sum of the reference current and the output current in response to a feedback signal; and a feedback amplifier coupled to the first transistor for generating the feedback signal to maintain the voltage with respect to ground at the first transistor substantially equal to a reference voltage so that the output current is substantially equal to an exponential function of a control voltage coupled between the first transistor and the second transistor.

2. The precision analog exponentiation circuit of claim 1 wherein the first transistor, the second transistor, and the variable current source are bipolar transistors.

3. The precision analog exponentiation circuit of claim 1 wherein the first transistor and the second transistor are process watched to minimize offset voltage.

4. The precision analog exponentiation circuit of claim 1 wherein the reference voltage is approximately equal to Vdd minus 0.5 V.

5. A precision analog exponentiation circuit comprising:

a first transistor coupled to a reference current for generating a voltage at the first transistor;

a second transistor coupled to the first transistor for generating an output current;

a variable current source coupled to the first transistor and the second transistor for generating a sum of the reference current and the cutout current in response to a feedback signal: and a feedback amplifier coupled to the first transistor for generating the feedback signal wherein the variable current source maintains the voltage at the first transistor substantially equal to a reference voltage so that the output current is substantially equal to an exponential function of a control voltage coupled to the first transistor and the second transistor:

a bipolar device connected in series between the first transistor and the variable current source;

and a bipolar device connected in series between the second transistor and the variable current source.

6. A method of generating a precision analog exponentiation function comprising steps of:

generating a reference current through a first transistor to generate a voltage with respect to ground at the first transistor;

generating an output current through a second transistor;

generating a sum of the reference current and the output current by a variable current source in response to a feedback signal; and generating the feedback signal to maintain the voltage with respect to ground at the first transistor substantially equal to a reference voltage so that the output current is substantially equal to an exponential function of a control voltage coupled between the first transistor and the second transistor.

7. The method of claim 6 further comprising a step for making the control voltage proportional to temperature.

8. The method of claim 6 further comprising a step of generating the reference voltage wherein the reference voltage is approximately equal to Vdd minus 0.5 V.

9. A method of generating a precision analog exponentiation function comprising steps of:

generating a reference current through a first transistor to generate a voltage at the first transistor;

generating an output current through a second transistor;

generating a sum of the reference current and the output current by a variable current source in response to a feedback signal;

generating the feedback signal to maintain the voltage at the first transistor substantially equal to a reference voltage so that the output current is substantially equal to first transistor and the second transistor; and calibrating the output current to equal the reference current for a control voltage of zero by providing an offset to the control voltage.

* * * * *

UNITED STATES PATENT AND TRADEMARK OFFICE

CERTIFICATE OF CORRECTION

PATENT NO. : 6,771,111 B2
APPLICATION NO. : 10/341963
DATED : August 3, 2004
INVENTOR(S) : Samuel W. Sheng and Ivan C. Eng It is certified that error appears in the above-identified patent and that said Letters Patent is hereby corrected as shown below:

Title page, Item (22) Filed: Jan. 13, 2002 change to -- Jan. 13, 2003 --.

Signed and Sealed this

Thirteenth Day of October, 2009

David J. Kappos
*Director of the United States Patent and Trademark Office*